Aug. 15, 1950  V. GUILLEMIN, JR  2,518,464
THERMOCOUPLE CONNECTOR
Filed Nov. 16, 1948
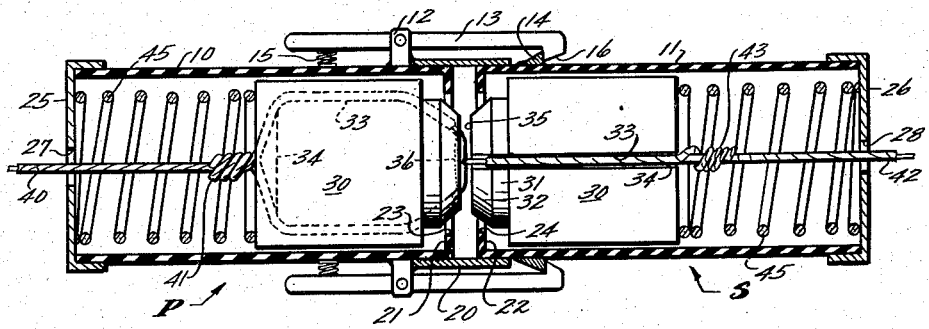
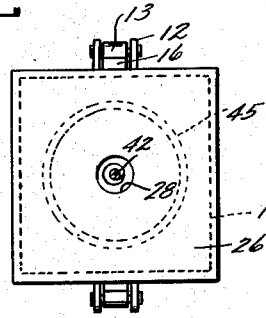
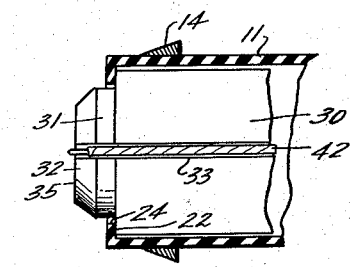
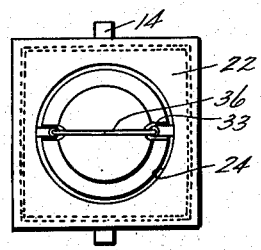
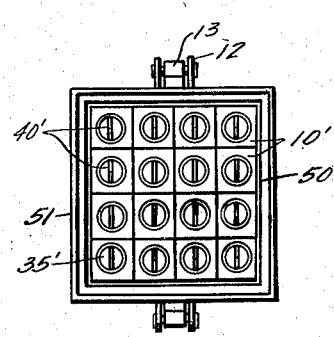
INVENTOR.
VICTOR GUILLEMIN JR.
BY Wade Koontz
ATTORNEY
H. H. Losche
—AGENT—

Patented Aug. 15, 1950

2,518,464

UNITED STATES PATENT OFFICE 2,518,464

THERMOCOUPLE CONNECTOR

Victor Guillemin, Jr., Oak Park, Ill.

Application November 16, 1948, Serial No. 60,361

6 Claims. (Cl. 173—328)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to improvements in disconnectible electric couplings and more particularly to electric connectors that may be constructed for a single circuit or a multiple of circuits that provides actual conductor-to-conductor connection favorable to the detection and measurement of highly sensitive current conduction.

The usual types of plug-and-socket connectors are not entirely satisfactory for coupling some electric circuits as thermocouple leads for the following reasons. These connectors usually have prongs on the plug member and holes in the socket member that are made of brass, copper, or bronze, having lugs thereon to which the lead wires are soldered. For example, assuming that copper-constantan thermocouples and brass plugs and sockets are used there will be in the constantan lead a constantan-to-brass junction followed by a brass-to-constantan junction in passing through the connector. If these two junctions are not at the same temperature, spurious potentials will be introduced into the circuit and erroneous readings of temperature will result.

There are various situations met in practice in which a difference in temperature may exist between the soldered junctions at the plug and at the socket. Hot and cold test cabinets or rooms are usually constructed with an inside panel upon which are mounted a number of sockets from which thermocouple wires lead to measuring instruments outside the chamber. The test object, which may be a human subject or a piece of apparatus or equipment, is fitted with thermocouples from which wire conductors run through a cable to a plug. The test object is placed in the chamber and the plug is inserted into the socket thus completing the circuit from the thermocouples inside the chamber to the measuring instrument outside. Experience has shown that if, for example, the test object is fitted with thermocouples and connecting cable and plug outside the chamber at room temperature and then introduced into the chamber at, say for example, −20° F., twenty to thirty minutes are required before the warm socket and cold plug come to temperature equilibrium and no reliable temperature readings of the test object can be taken before the end of this time. In cases where it is desirable to follow the temperature changes in the test object from the beginning of exposure to cold, this delay is unfortunate.

Another common situation, in which the junctions at the socket and at the plug may differ in temperature, arises when the test chamber temperature is varied rapidly, for example, to test the effect upon a piece of aircraft equipment of the rapid temperature changes occuring during flight. In such cases, one can never be sure that the socket and the wire conductors leading to it from outside the chamber will follow the temperature variations in the same way as the plug and its wire conductors inside the chamber, a factor which may cause significant errors in the temperature readings.

Finally, if the wire conductors leading respectively to the plug and to the socket are located in different ambient temperatures, the constant temperature differential will persist between the soldered junctions at the plug and socket and this will cause a constant error in the temperature readings.

In accordance with the present invention, all of these difficulties are overcome by a structure in which the wire conductors leading to the plug and from the socket are brought into direct contact when the connections are made, there being no metal necessary in the plug or socket circuit besides the wire conductors themselves.

It is a primary object of this invention to provide an electrical connector that makes direct contact between the wire conductor leads.

It is another principal object of this invention to provide an electrical connector for bringing a plurality of wire conductors of plug and socket elements into actual conductor-to-conductor contact for establishing a plurality of separate circuits unaffected by a temperature differential existing between the plug and socket elements.

It is a further object of this invention to provide an electrical connector in which the wire conductors of plug and socket elements are held in a position to cross the face of a block of electrical insulating material spring biased outwardly from respective plug and socket casings, the plug and socket casings having latching means to positively hold the plug and socket elements together with the corresponding wire conductors positioned at relative right angles and in direct resilient contact with each other.

These and other objects and advantages will become more apparent as the description proceeds with reference being made to the accompanying drawing illustrating preferred embodiments of the invention, in which:

Fig. 1 is a longitudinal sectional view of one illustration of the conceived invention;

Fig. 2 is an end elevational view of the electrical connector as seen from the right end of Fig. 1;

Fig. 3 is a partial sectional view of the contact end of the right socket connector element of Fig. 1;

Fig. 4 is an elevational view of the contact and of the socket connector element as will be seen looking at Fig. 3 from the left; and Fig. 5 is an elevational view of the contact end of one of the connector elements showing a plurality of conductors therein.

Referring to Figs. 1 to 4, inclusive, and particularly to Fig. 1, there is shown the electrical connector illustrating this invention in connected relation wherein, for the purpose of explanation, one connector part will be referred to as the plug P and the other connector part will be referred to it as the socket S. The connector is shown as having two box-like elements made of any known material but preferably of some electrical insulating material, one for the plug P referred to by the reference character 10 and the other for the socket S designated by the reference character 11 which are similar except that the plug element 10 has upstanding bifurcated brackets 12 positioned externally on opposite sides thereof for pivotally supporting latch levers 13, while the socket element 11 has latch catches 14 positioned externally on the opposite sides thereof. A spring 15 is positioned between the handle portion of each latch lever 13 and the plug element 10 to bias the latch lever in a direction to force a latch pawl 16 thereon toward the socket element 11 and over the companion latch catch 14. The plug element 10 also differs from the socket element 11 in having an enlarged guide portion 20 fixed thereto into which the socket element 11 slips in the connected condition, as shown in Fig. 1. The inner end of each connector element 10 and 11 has an end wall 21 and 22, respectively, with a central opening 23 and 24, respectively, therein. The outer end of each connector element 10 and 11 has a cover 25 and 26, respectively, securely fastened thereto having a central opening 27 and 28, respectively, therein.

Within each connector element 10 and 11 is a square block of insulating material 30 each having a cylindrical portion 31 terminating in a frusto-conical portion 32. The cylindrical portion 31 is of slightly less diameter than either of the openings 23 or 24 in the plug or socket in order that the block of each may rest with the frusto-conical portion 32 protruding through the end wall 21 of the plug assembly and 22 of the socket assembly. Each block 30 has a groove 33 cut longitudinally along opposite sides thereof which are connected across the back by a groove 34. The contact face 35 of each block 30 has a shallow groove 36 that connects the grooves 33. An insulated wire conductor 40 entering the opening 27 is looped around the insulating block 30 in the plug P resting in the grooves 33, 34 and 36 and twisted on itself at 41. In like manner, an insulated wire conductor 42 passes through the opening 28 of the socket assembly S and is looped around the insulating block 30 with the wire following the grooves 33, 34 and 36 and wound on itself at 43. The groove 36 is so shallow that approximately one-half of the wire is above the contact face 35 of the insulating block 30. The insulation is removed from the wire conductors 40 and 42 on the portions traversing the contact faces 35 in order to provide contact areas for direct conductor connection of the leads 40 and 42. The insulating blocks 30 are positioned in their respective connector elements 10 and 11 such that the grooves 33 of one are in a plane parallel to the plane through the latch means 13, 14, while the grooves 33 of the other are in a plane normal to the latch means 13, 14 in order to bring the conductors 40 and 42 in crossed contacting relation as shown in Fig. 1.

In order that the conductors 40 and 42 be held firmly in contact, each insulating block 30 has a spring 45 compressed between it and the corresponding cover 25 and 26. When the connector is disjointed, each spring 45 will bias the corresponding insulating block 30 outwardly until the shoulder formed by the square body portion and the cylindrical portion 31 engages the respective end wall 21 or 22, as illustrated in the partial view of the socket S in Fig. 3. Upon the plug P and socket S being connected, as illustrated in Fig. 1, the conductors 40 and 42 engage at the contact faces 35 forcing the insulating blocks inwardly in their respective connector elements against the force of the springs 45 until the latch pawls 16 snap over the latch catches 14. To thereafter disconnect the two parts of the connector, the handle portions of the latch levers 13 are depressed and the plug and socket elements pulled apart. While the contact holding blocks 30 of both the plug and socket elements are shown and described as being spring biased for simplicity of construction and manufacture, it is to be understood that it comes within the purview of this invention to bias only one of the companion holding blocks where desirable.

The connector of this invention may find many uses in various types of electrical circuits but finds special utility in measuring circuits or circuits handling very small currents wherein it is essential to have similar metal throughout the circuit in order that temperature changes will not affect current flow across the connector. By way of illustration, the conductors 40 and 42 may be connected in a thermocouple measuring circuit. The conductors 40 and 42 through the connector are in actual contact such that temperature changes will not affect current flow through this connector and thus change the measured thermocouple temperature.

It may be desirable to provide a plurality of such connections in a single connector. This may be accomplished as shown in Fig. 5 by providing box-like containers as illustrated at 50 for the plug element of a size to house a plurality of individual plug connectors 10' similar to the plug connectors P shown in Fig. 1, except that the latching means 12—13 and the guide element 20 are not necessary to the individual connectors. The latching means 12—13 and a guide element 51 in this modification are positioned on the box-like plug container 50 and the latch catches 14 are positioned on the companion socket container (not shown). The number of individual connectors for such connectors will be an even number but any number of the plurality of the individual connectors may be used. To insure the proper relative connection of the companion plug and socket components of the multiple connectors, the connector containers may be keyed in any well known manner. The modification illustrated in Fig. 5 provides the connection of a plurality of circuits by coupling the single plug and socket components wherein each circuit is established by actual contact relation of the electrical conductors.

While I have illustrated the preferred forms of this invention, it is to be understood that various modifications and changes may be made in the structural details and features without departing from the spirit and scope of this invention and I desire to be limited only by the scope of the appended claims.

I claim:
1. An electrical connector device for coupling electrical circuits by direct electrical conductor contact comprising; plug and socket members releasably coupled at companion faces thereof, each member having a companion insulating block slidingly biased toward the coupling face of said member for bringing said companion insulating blocks into resilient engagement at contact faces thereof; and an electrical conductor end wrapped around each said insulating block with a bare portion thereof traversing the respective contact face whereby an electrical circuit is established through the electrical conductors joined by said companion insulating block means.

2. An electrical connector for coupling electrical circuits by direct electrical conductor contact comprising; plug and socket members releasably connected to hold companion faces thereof in contiguous relation; an insulating block in each plug and socket member slidably biased toward the companion face of the respective member, each said insulating block having an extended contact face adapted to protrude through the corresponding companion face of said members and rest in engagement; a wire conductor end encircling each said insulating block with a bare contact portion traversing the extended contact face thereof such that the bare contact portions of the wire conductors of each insulating block are held in direct contact by the bias of said insulating blocks to establish a circuit through said conductors without passing through dissimilar metals.

3. An electrical connector for coupling electrical circuits by direct electrical conductor contact comprising: two elongated box-like elements each having end walls with central openings therein; an electrical conductor holding block slidable in each box-like element, each said block having a short extension on one end thereof of less cross sectional area than the area of one of the central end wall openings of each box-like element adaptable to pass through said central end wall opening, and each block having a groove cut completely around it in a longitudinal direction, the part of the groove traversing said short extension being shallow and the plane of the groove across the short extension of said block in one box-like element lying at right angles to the plane of the groove across the short extension of said block in the other box-like element; an electrical conductor encircling each block and lying in said block grooves and leading through the central opening opposite the central opening of said box-like element accommodating the short extension of said block, the portion of said electrical conductor lying in the shallow groove portion on said short extension protruding above the surface of said short extension and being cleaned for electrical contact; spring means in each box-like element compressed between said block and said end wall through which said electrical conductor extends for biasing the cleaned portion of each electrical conductor traversing the short extension of each block into firm electrical engagement at the point where the shallow grooves cross; and means for releasably retaining said box-like elements together whereby an electrical circuit is established through said electrical conductors by direct contact thereof.

4. An electrical connector for coupling electrical circuits by direct electrical conductor contact comprising; plug and socket members each having an open end face and being releasably connected to each other to hold said open end faces in adjacent registering relation, an insulating block in each plug and socket member slidably biased for projection from said open end faces, a wire conductor extending into each plug and socket member and extending around the insulating block therein, means on each insulating block to hold said wire conductor in fixed relation with respect thereto and with the conductor extending diametrically across the projecting portion thereof, and means on said members and blocks to hold said blocks in relative positions such that the conductor portions extending diametrically thereacross will be in crossing relation.

5. An electrical connector for coupling electrical circuits by direct electrical conductor contact comprising; hollow plug and socket members of non-circular cross section each having an open end face and being releasably connected to each other to hold said open end faces in adjacent registering relation, an insulating block in each plug and socket member slidably biased for projection from said open end faces and being of non-circular cross section similar to the cross section of said members to prevent relative rotation therebetween, means providing a passage into each plug and socket member for a wire conductor, and groove means along opposite lateral sides of each insulating block for passage of a loop of said wire conductor with a section thereof crossing the projecting portion of each block, and means for releasably connecting the plug and socket members in fixed relation with the planes determined by said groove means in intersecting relation, whereby the sections of said wire loops crossing the projecting portions of said blocks will cross each other in contacting relation.

6. An electrical connector for coupling electrical circuits by direct electrical conductor contact comprising; hollow plug and socket members each having an open end face and being releasably connected to each other to hold said open end faces in adjacent registering relation, said members having closed remote end portions provided with central wire conductor receiving openings, an insulating block slidably mounted in each of said members, a compression coil spring in each of said members between said closed end portions and said insulating blocks to normally project adjacent portions of said blocks from the open end faces of said members, and groove means along opposite lateral sides of each insulating block for passage of a loop of wire conductor with a section thereof crossing said projecting portion of each block, for mutual current conducting contact between loops encircling adjacent insulating blocks of said electrical connector.

VICTOR GUILLEMIN, Jr.

REFERENCES CITED

The following references are of record in the file of this patent:

UNITED STATES PATENTS

| Number | Name | Date |
|---|---|---|
| 220,936 | McTighe | Oct. 28, 1879 |
| 2,066,770 | Doane | Jan. 5, 1937 |
| 2,410,098 | Muller | Oct. 29, 1946 |
| 2,437,018 | Dodson | Mar. 2, 1948 |

FOREIGN PATENTS

| Number | Country | Date |
|---|---|---|
| 640,631 | France | July 18, 1928 |